J. W. BERWICK.
MOVING PICTURES IN COLORS.
APPLICATION FILED AUG. 23, 1916.

1,321,705. Patented Nov. 11, 1919.

WITNESSES
Edw. Thorpe
C. Bradway

INVENTOR
J. W. Berwick
BY
ATTORNEYS

UNITED STATES PATENT OFFICE.

JOHN WYNNE BERWICK, OF NEW YORK, N. Y., ASSIGNOR TO RAINBOW PICTURES CORPORATION, A CORPORATION OF NEW YORK.

MOVING PICTURES IN COLORS.

1,321,705.   Specification of Letters Patent.   Patented Nov. 11, 1919.

Application filed August 23, 1916. Serial No. 116,453.

*To all whom it may concern:*

Be it known that I, JOHN W. BERWICK, a subject of the King of Great Britain, and a resident of the city of New York, borough of the Bronx, in the county of Bronx and State of New York, have invented new and Improved Moving Pictures in Colors, of which the following is a full, clear, and exact description.

This invention relates to motion pictures, and more particularly to the art of taking and projecting motion pictures in colors, wherein the successive pictures are taken on orthochromatic or panchromatic films through the moving color filter or filters, and positive transparencies of such films are similarly projected.

The invention has for its general object to provide means whereby the natural shades and tones of the subject or scene photographed can be more nearly reproduced on projection.

A more specific object is to improve the methods so that it is possible to add, reinforce, accentuate or subdue any of the sharply cut primary colors employed in the taking or projection of sections of the color separated images that merge in the eye of the observer as a composite or natural picture by the persistence of vision.

A further object is to reduce to a minimum the well-known "flicker" effect in color moving picture projection, which flicker is often caused by the different sharp-cut primary colors appearing alternately on projection when one or more primary colors predominate.

It is well known in the art of taking moving pictures in colors that in order to separate each primary color of the subject or scene it is necessary to use filters of more or less sharp absorption of color bands. A full color value is only then produced when the negative film best distinguishes the variation of color.

The sharpness of the absorption bands is of great importance in respect of the luminosity of the colors produced by them. Natural colors, however, do not present these sharp absorption bands, the absorption being always more or less gradual.

These are the obstacles that must be overcome in moving pictures in colors:

By using weak absorption color bands the negative film does not distinguish well the variation of colors, and the colors on projection are not luminous. If filters of sharp color absorption bands are used, the colors do not merge to natural shades and tones of the colored object. Hence, with the two color moving picture methods heretofore proposed, the colors are too bright or too weak, and they do not correspond in shades or tones with the object; and furthermore, extreme "flicker" is present.

My improved method to correct these objections, whereby the natural shades and tones of moving picture colored objects with a minimum amount of "flicker" can be more nearly reproduced on projection, is based on the well-known three or more color half-tone or photochrome processes, wherein a "key" plate is alternately employed with several color-separated plates bearing the images of varying colors. This "key" plate is usually a black and white plate obtained without any color separation filter, and therefore presents the full monochromatic value of the image.

A "key" plate is used to complete and to balance the component color-separated plates of the image and to correctly adjust where necessary the shades and tones in the reproduction of the colored object.

The "key" plate is usually printed in gray-blue or blue-black color or in any color that the instant or particular color of the reproduced object necessitates, in order to add, subdue or reduce, balance or reinforce any of the primary colors forming or to form the colored image of the object in combination with the other component color separating plates produced by means of photographing through primary color filters on color sensitive plates termed "panchromatic" or "orthochromatic," as it is well known in the art.

While in the science of lithography or photochrome art a key plate is found very important, as explained above, it is also known in this art that printing colors necessarily have to be changed in order to get a true color reproduction of the subject to be reproduced, and workers skilled in the art of photolithography and photochrome processes are using printing colors which they term "primary," "secondary" or "tertiary" in order to obtain the very fine shades of color of the subject.

While the lithographic or photochrome art has advanced to such a fine point by having and employing so many methods and mechanical contrivances to translate the natural and true colors of the original by mixing different colors, adding or etching or reducing, the art of producing motion pictures in true colors has been limited by lack of practical methods by which it could be possible to mix, add, reinforce or subdue colors in order to approach the natural shades or tones of the colored object.

Now, since I have described the principles of the "key" plate and its advantages in color half-tone or photochrome color printing and since I have also explained the necessity in color printing of having the colors mixed, added or reduced in order to translate the true value and shades of color of the original, I will proceed to show how, with my improved method based on the lithographic and photochrome processes, I introduce the so-called "key" plate which enables one to add to or reinforce weak or missing colors, or reduce predominating colors in the projected image of moving pictures.

My improved method relates to processes wherein the successive pictures are taken usually on an orthochromatic or panchromatic film, through the color divisions of a moving color filter or filters. The positive transparencies are prepared from the negative film and are then projected with the aid of a moving color filter or filters.

Such filters are usually arranged and operated so that the successive pictures are taken and projected through filters of different primary colors which are used in a rotating disk or shutter in the optical field, either in front or back of the photographic lens.

My improved method calls for very important changes or innovations in the art of taking and projection of moving pictures in colors, and by which method the negative film aside from showing the color-separated sections of the image of the subject, shows one section of the film of a regular picture length recurring at intervals in "black and white" quality.

This section of the black and white quality, showing in full detail the image of the subject, is the image that is corresponding in every respect to the "key" plate of the lithographic, color half-tone and photochrome processes, and I will show later that this "key" section image in black and white quality will control the shades and tones of the final projected image when the color-separated images and the key will overlap each other, and will also cause softer gradation and less "flicker", because it will be manipulated similar to the key plate described in the art of the mechanical color printing processes.

This "key" section or black and white section of the image is obtained in the taking camera by leaving open without any color filter one section of the rotating color screen, well known in the art of moving pictures in colors.

As far as I am aware, I am the first to employ a rotating color screen having an open space devoid of any filter or filters by which the negative film when developed will show sectional images, one section of a black and white regular quality, and two or three other components of the full image in color-separating quality (which are meant upon projection of the positive film to overlap in the eye of the observer by persistence of vision and form one full image in colors.) Whether there are two or three color-separated components in the full image will, of course, depend upon whether there are three or four recurring sections in the field of the rotating color screen used in taking the negative film. That is to say, in case there are three recurring sections in the field of the rotating color screen under my improved method, two sections will be filled with primary color filters and one section remains open without any filter. In case there are four recurring sections in the field of the rotating color screen under my improved method, three sections will be filled with primary color filters, and one section remains open without any filter, the primary color filters producing in the negative film color-separated sectional images, and the open space producing a black and white quality section image. Both in combination form on projection of the positive transparency the final full or composite image of the object or scene.

While I prefer to have the black and white key sectional image to appear in the optical field of the rotating color screen so that this section overlaps on projection all the color-separated component sections of the full and final image, I wish to make it plain that it can be also successfully arranged in the screen to appear either between the color-separated components or to appear on projection as the very first section.

From a negative film thus produced, a positive transparency is made and is now ready for projection in colors with the aid of recurring color filters, the black and white or "key" section at this stage assuming the important control of colors in the projection of the final colored image as explained below, or this positive transparency bearing the black and white or key section image and the color separated images can be directly colored, dyed or toned photographically as it is well known in the art. In such case the color screen will be only used in the taking camera to produce in the negative film images of black and white and color separated quality and the projection of the positive in colors will take place without any recurring color filters. But before touching upon the projection of this positive transparency in colors, I wish to refer again to the basis of my improved method of obtaining moving pictures in colors, whereby the natural shades and tones of the subject can be more nearly reproduced on projection, which is the mechanical color printing processes as mentioned above and I will compare this now: picture positive transparency with the color printing plates of the mechanical processes.

Where it is desired to obtain prints in colors from the photomechanical plates, pigments of various shades of color from primary to tertiary are used. In the moving picture method the usual means for producing color is by using recurring color filters either in front or in back of the photographic lens.

And where in combination with the color-separated plates, the key plate of the mechanical printing processes is used to either add, subdue or reduce, balance and reinforce any of the primary colors forming or to form the natural shades or tones of the colored object; here in my process of moving pictures in colors the sectional image of this "black and white" key positive transparency is utilized for similar purposes in combination with the component color extracted or separated section or sections of the full image.

And whereas the instant the special depth of color or character of the original would require to print the mechanical key plate in shades and tones of a color that would either add to or balance or reinforce the other component color plates, so similarly I employ in projection the black and white key section image by coloring it on projection with the aid of one of the recurring filters, the color, shades and tones of which will depend either upon the color of the object or the particular scene photographed and the light or atmospheric condition under which the negative film was exposed.

It is known to the informed in the art that the orthochromatic and panchromatic light sensitive films are not fully sensitive to all colors of nature, and some colors, for instance, deep red, require longer exposure to perfectly extract and register it in the photographic film. This is one of the reasons that producers of moving pictures in colors failed to produce perfect results, because even under excellent light conditions, a "deep red" would not be dense enough in the negative film to show sufficient red value of the image in the red projecting positive section, and consequently where the details were missing the colors would not project or mix the true shades of the original. This is especially true when light condition under which the negative film was exposed, through primary color filters, is not favorable. But in my process as the black and white section is not obstructed by any color filter, I obtain full value of the light and register in this section of the film every detail of the full image of the subject and where some of the component color section or sections would fail to produce or register correctly the important details, on account of poor light conditions, it can be supplemented on projection by the black and white key section image, as explained below, and besides it will support, to a large degree, any of the primary component colors not fully expressed on projection to form the shades and tones of the original by utilizing one of the recurring projecting color filters, filled in one of the spaces of the rotating color screen and timed to appear on projection simultaneously with the key black and white positive transparency.

I wish to have it understood that the open space in the field of the taking rotating color screen can be manipulated similar to photographic lenses, as by stopping it down.

By stopping the open space I am in position to restrain or subdue the unobstructed light passing through the open space to the sensitive film and thus varying the densities of the "key" black and white section, and to make it clear I am in position to leave this open space for the light to pass through unobstructed and obtain "overtimed" or correctly timed images and accordingly vary in density, or slightly stop down, and if necessary reduce the opening to a minimum, so that the image will appear "undertimed" and give less density. The terms "overtimed" and "undertimed" are to be understood as they are generally adopted and known in the art of photography. I wish to have it understood that where I have used the following terms— "black and white" section, or "black and white" quality section, or key "black and white" section,—I mean a photographic negative film section which was exposed in a taking moving picture camera to light directly without any color filter, and consequently has registered non-selectively details of colored objects without accentuating or separating any of the primary colors; or, in other words, the above-quoted terms mean picture sections having non-selective values.

In the accompanying drawing—

Figure 1:
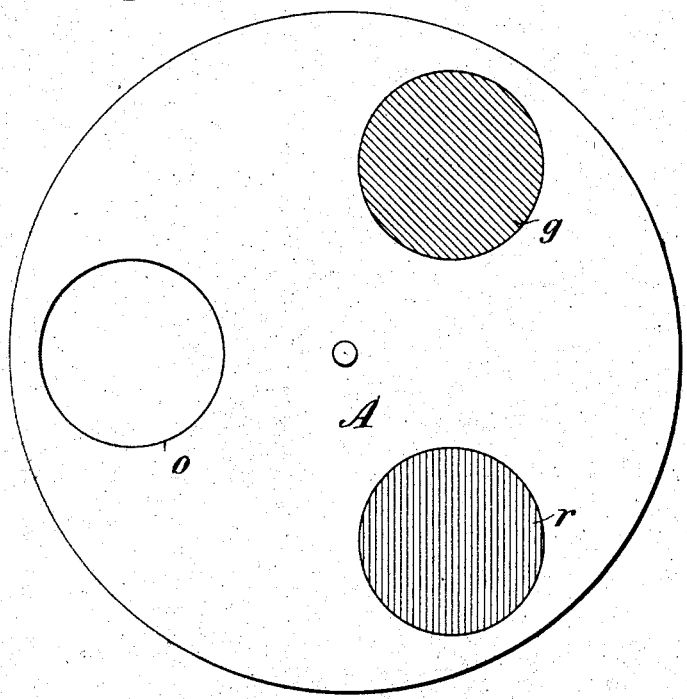
Figure 1 is a front view of a simple form of a color screen employed for carrying out the process.

Referring to the drawing, A designates a screen which is rotatably disposed with respect to the optical field of the moving picture taking camera in the usual manner, and it is provided with suitable color filters, two being shown in the present instance. The filter $r$ is red and the filter $g$ green; and also in the screen is an opening $o$ which is devoid of a color filter. The screen travels in timed relation with the negative film, so that as a result the negative film will have successive sections $g'$, $r'$ and $w'$, which are respectively of green, red and black and white quality.

Figure 2:
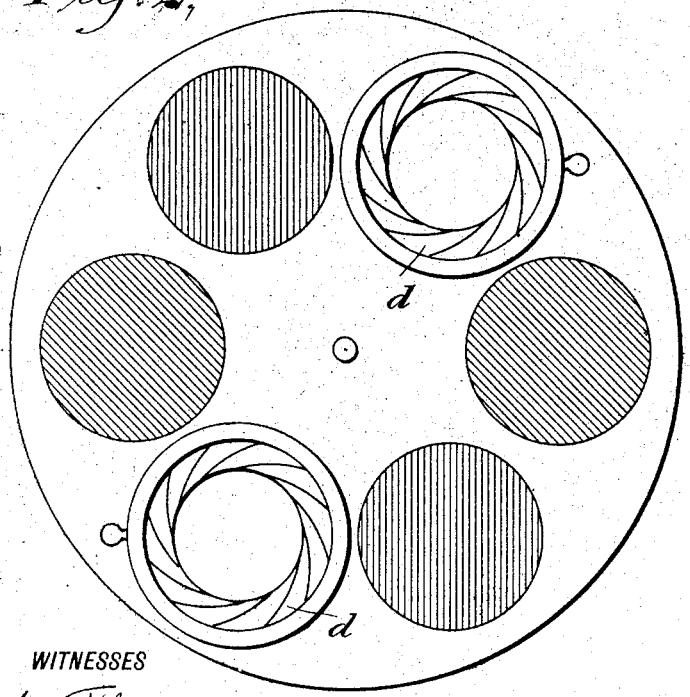
Fig. 2 is a view of a compound color screen having a plurality of series of color filters and openings.
Figure 3:
Fig. 3 is a portion of a negative film showing sections of black and white quality and of color-separated qualities.

If desired, the screen may have a plurality of series of filters and openings, as shown in Fig. 2, and if desired the black and white opening may be rendered adjustable by the use of an iris diaphragm $d$, or the equivalent, so as to vary the effective size of the opening or openings by which the black and white sections are taken or projected. A transparency is made from the negative film and is projected with the aid of a recurring color screen, with this important feature—that one of the sectors in the field of the projecting color screen is either left open and is thus devoid of color or filled with a filter which I will term "color modifying filter," whose function is to color on projection the black and white section of the positive transparency, and thus the key is turned to a color factor with the aid of this color modifying filter, which makes it possible to add to, reinforce, accentuate, subdue or balance any of the primary colors of the projected color separated component sectional images; and so providing means whereby the natural shades and tones of the objects or scene photographed can be more nearly reproduced on projection.

Although the drawings illustrate color screens having two primary color filters to one opening, it is to be understood that any number of color filters may be used.

Having thus described my invention, I claim as new and desire to secure by Letters Patent:

1. A screen for color moving pictures having a plurality of sections each filled with a primary color filter and also a section open or devoid of color, and stepping down means for varying the size of said open section, said means including a diaphragm having an opening the border of which is radially reducible to a common center.

2. The process of reproducing moving pictures in colors from a film having sections taken through primary color filters and sections taken without filters, which consists in projecting the color-separated sections of the film with the aid of recurring color filters, and projecting each of the black and white sections with the aid of a modifying filter.

3. The process of producing moving pictures in colors from a film having picture sections in which picture sections of color selective values occur at regular intervals, with intermediate picture sections of non-selective values in alternating relation to each other, which consists in projecting the color selective sections with the aid of recurring primary color filters and the sections of non-selective value with the aid of recurring suitable modifying filters to blend on projection the non-selective images with the color selective images into the color shades and tones of the object.

4. A screen for color moving pictures having a plurality of openings therethrough each filled with a primary color filter, and also an opening devoid of color, and stepping-down means mounted in said last mentioned opening, said means including an iris diaphragm.

JOHN WYNNE BERWICK.